(12) United States Patent
Wang

(10) Patent No.: US 9,485,331 B2
(45) Date of Patent: Nov. 1, 2016

(54) PROGRAM SWITCHING METHOD, APPARATUS, AND MEDIA SERVER

(71) Applicant: Huawei Technologies Co., Ltd., Shenzhen (CN)

(72) Inventor: Zhengyang Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 446 days.

(21) Appl. No.: 14/071,264

(22) Filed: Nov. 4, 2013

(65) Prior Publication Data

US 2014/0059121 A1 Feb. 27, 2014

Related U.S. Application Data

(63) Continuation of application No. PCT/CN2011/083056, filed on Nov. 28, 2011.

(51) Int. Cl.
| | |
|---|---|
| H04L 29/06 | (2006.01) |
| H04N 21/235 | (2011.01) |
| H04N 21/435 | (2011.01) |
| H04N 21/438 | (2011.01) |
| H04N 21/61 | (2011.01) |
| H04N 21/845 | (2011.01) |
| H04N 21/658 | (2011.01) |

(52) U.S. Cl.
CPC ............ *H04L 67/42* (2013.01); *H04N 21/235* (2013.01); *H04N 21/435* (2013.01); *H04N 21/4383* (2013.01); *H04N 21/4384* (2013.01);
(Continued)

(58) Field of Classification Search
CPC ........... H04L 65/1016; H04L 65/4076; H04L 67/42; H04N 21/235; H04N 21/435; H04N 21/4383; H04N 21/4384; H04N 21/6125; H04N 21/8456
See application file for complete search history.

(56) References Cited

U.S. PATENT DOCUMENTS

| | | | |
|---|---|---|---|
| 7,921,222 B2* | 4/2011 | Courtemanche ... | H04N 21/4384 370/328 |
| 7,934,010 B2* | 4/2011 | Foster ............... | H04L 29/06027 709/230 |

(Continued)

FOREIGN PATENT DOCUMENTS

| | | |
|---|---|---|
| CN | 1929596 A | 3/2007 |
| CN | 101102465 A | 1/2008 |

(Continued)

OTHER PUBLICATIONS

RFC 236—Real Time Streaming Protocol(RTSP): Schulzrinne, et al., Apr. 1998.*

(Continued)

*Primary Examiner* — Hai V Tran
(74) *Attorney, Agent, or Firm* — Slater Matsil, LLP

(57) ABSTRACT

Embodiments of the present invention provide a program switching method, apparatus, and media server. A content identifier of a target program is obtained directly, and a message for triggering a media server to transmit data is sent to the media server, so that the media server switches a time-shifted program. In the process of switching the time-shifted program, no signaling for tearing down and reestablishing a communication connection and media transmission channel is generated. The technical solution provided by embodiments of the present invention solves the problem in the prior art that a lot of signaling interactions and a long switching time are needed during the switching of a time-shifted program, thereby reducing the switching time of the time-shifted program, improving switching efficiency, and improving user experience.

14 Claims, 5 Drawing Sheets

(52) U.S. Cl.
CPC ...... *H04N21/6125* (2013.01); *H04N 21/6581* (2013.01); *H04N 21/8456* (2013.01)

(56) References Cited

U.S. PATENT DOCUMENTS

2008/0263219 A1* 10/2008 Bacchi .............. H04L 29/06027
709/231
2009/0183211 A1* 7/2009 Yan .................... H04N 7/17318
725/88

FOREIGN PATENT DOCUMENTS

| CN | 101287098 A | 10/2008 |
|---|---|---|
| CN | 101426124 A | 5/2009 |
| CN | 101437154 A | 5/2009 |
| CN | 102075795 A | 5/2011 |
| WO | 2004057867 A1 | 7/2004 |
| WO | 2007028309 A1 | 3/2007 |

OTHER PUBLICATIONS

RFC 2327—SDP: Session Description Protocol: Handley & Jackson; Apr. 1998.*
Chinese Office Action received in Application No. 201180002700.9 mailed Jun. 28, 2013, 9 pages.
Chinese Search Report received in Application No. 2011800027009 mailed Jun. 19, 2013, 2 pages.
International Search Report and Written Opinion received in Application No. PCT/CN2011/083056 mailed Aug. 30, 2012, 14 pages.

* cited by examiner

PROGRAM SWITCHING METHOD, APPARATUS, AND MEDIA SERVER

This application is a continuation of International Application No. PCT/CN2011/083056, filed on Nov. 28, 2011, which is hereby incorporated herein by reference in its entirety.

TECHNICAL FIELD

The present invention relate to the field of information technologies, and in particular, to a program switching method, apparatus, and media server.

BACKGROUND

In recent years, with rapid development of the Internet and progress of data compression and transmission technologies, a multimedia communication technology has witnessed unprecedented development, and various multimedia applications are gradually integrated into people's life; NGOD (Next Generation On Demand) is a new-generation multimedia video on demand service architecture.

A basic NGOD architecture is made up of multiple components, including: a media server, an on-demand client, a back-end management device Backoffice, and an EPG (Electronic Programmer Guide, electronic programmer guide) server. The media server is responsible for sending a digital video stream to a terminal device through a transmission network and an edge device, and usually uses, within its fault-tolerant capability, a mass storage hard disk to store audio and video content in an MPEG (Moving Pictures Experts Group, Moving Pictures Experts Group) format. Particularly, the media server supports operations such as pausing, fast forwarding, and rewinding. The on-demand client is a device connected to a display device and an external signal source, and is responsible for converting compressed digital signals into audio and video signals. The back-end management device Backoffice is used for user authentication and resource management in an on-demand session. The EPG server is used to provide a program guide for users, where the program guide includes a live program guide, a forecast program guide, and a time-shifted program guide, and the program guide provides related information about various programs.

The NGOD architecture supports a program playback service. When a user watches a live program online, the user can press a playback button to enter a playback mode to watch a time-shifted program, and can perform operations such as fast forwarding and rewinding for the time-shifted program. At present, although switching between time-shifted programs can be implemented when a time-shifted program is watched in the playback mode, switching of the time-shifted program can be completed only after multiple signaling interactions between the on-demand client and the media server in the process of switching the time-shifted program. Therefore, a lot of signaling interactions and a long switching time are needed, and switching efficiency is low.

SUMMARY OF THE INVENTION

Embodiments of the present invention provide a program switching method, apparatus, and media server to solve the problem in the prior art that a lot of signaling interactions and a long switching time are needed during the switching of a time-shifted program.

An embodiment of the present invention provides a program switching method, including receiving, by a program selection device, a notification message sent by a media server, where the notification message carries information indicating that a time-shifted program is played back to a border of the time-shifted program, obtaining, by the program selection device, a content identifier of a target program directly according to the information carried in the notification message, and sending, by the program selection device to the media server, a message for triggering the media server to transmit data, where the message carries the content identifier of the target program, so that the media server transmits the target program to a terminal device according to the content identifier.

An embodiment of the present invention further provides a program switching method, including sending, by a media server, a notification message to a program selection device, where the notification message carries information indicating that a time-shifted program is played back to a border of the time-shifted program, so that the program selection device obtains a content identifier of a target program directly according to the information carried in the notification message, receiving, by the media server, a message sent by the program selection device, for triggering the media server to transmit data, where the message carries the content identifier of the target program, and transmitting, by the media server, the target program to a terminal device according to the content identifier.

An embodiment of the present invention further provides a program switching apparatus, including a receiving module, configured to receive a notification message sent by a media server, where the notification message carries information indicating that a time-shifted program is played back to a border of the time-shifted program, an obtaining module, configured to obtain a content identifier of a target program directly according to the information carried in the notification message, and a triggering module, configured to send to the media server a message for triggering the media server to transmit data, where the message carries the content identifier of the target program, so that the media server transmits the target program to a terminal device according to the content identifier.

An embodiment of the present invention further provides a media server, including a first sending module, configured to send a notification message to a program selection device, where the notification message carries information indicating that a time-shifted program is played back to a border of the time-shifted program, so that the program selection device obtains a content identifier of a target program directly according to the information carried in the notification message, a service receiving module, configured to receive a message sent by the program selection device, for triggering the media server to transmit data, where the message carries the content identifier of the target program, and a second sending module, configured to transmit the target program to a terminal device according to the content identifier.

In embodiments of the present invention, a content identifier of a target program is obtained directly, and a message for triggering a media server to transmit data is sent to the media server, so that the media server switches a time-shifted program. In the process of switching the time-shifted program, no signaling for tearing down and reestablishing a communication connection and media transmission channel is generated. Therefore, embodiments of the present invention solve the problem in the prior art that a lot of signaling interactions and a long switching time are needed during the switching of a time-shifted program, thereby reducing the switching time of the time-shifted program, improving switching efficiency, and improving user experience.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

First a program switching method in the prior art is introduced before a program switching method, apparatus, and media server provided by embodiments of the present invention are introduced.

Figure 1:
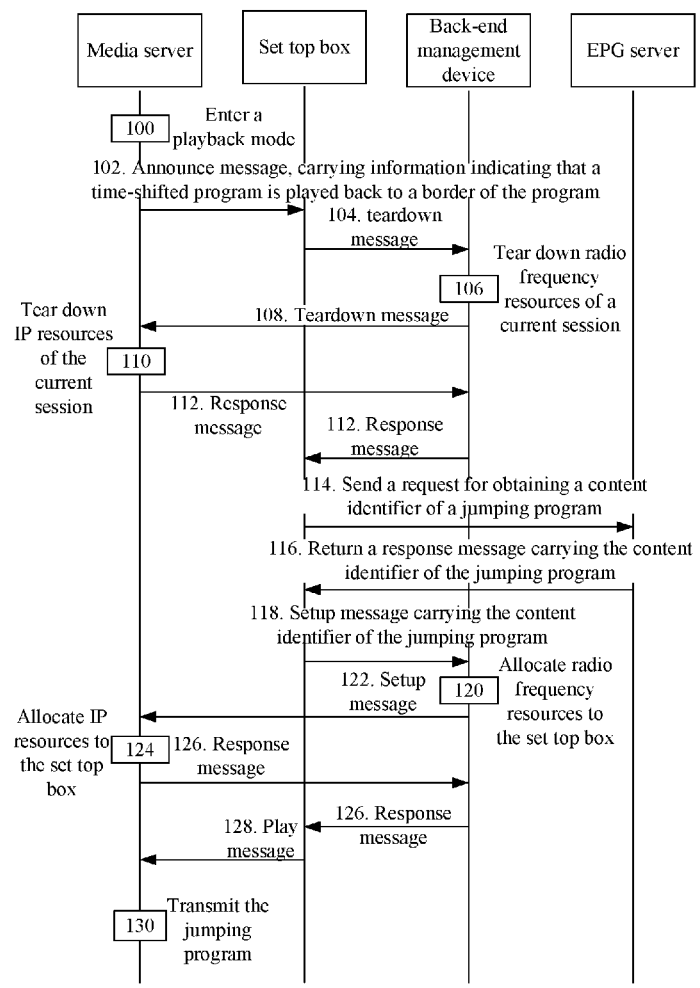
FIG. 1 is a schematic flowchart of a program switching method in the prior art.

FIG. 1 is a schematic flowchart of a program switching method in the prior art. As shown in FIG. 1, the method includes:

Step 100: A media server enters a playback mode.

Step 102: When a time-shifted program is played back to a border of the time-shifted program, the media server sends a notification message, for example, an announce message, to a set top box, where the message carries information indicating that the time-shifted program is played back to the border of the program.

Step 104: The set top box sends a session teardown message, for example, a teardown message, to a back-end management device Backoffice.

Step 106: The back-end management device Backoffice tears down radio frequency resources of a current session.

Step 108: The back-end management device Backoffice forwards the session teardown message to the media server.

Step 110: The media server tears down IP (Internet Protocol, Internet Protocol) resources of the current session after receiving the session teardown message.

Step 112: The media server returns a response message to the back-end management device Backoffice, and the back-end management device Backoffice forwards the response message to the set top box.

Step 114: The set top box sends a request for obtaining a content identifier of a target program to an EPG server.

Step 116: The EPG server returns a response message to the set top box, where the response message carries the content identifier of the target program.

Step 118: The set top box sends a session setup message, for example, an RTSP session setup message, to the back-end management device Backoffice, where the session setup message carries the content identifier of the target program.

Step 120: The back-end management device Backoffice allocates radio frequency resources to the set top box.

Step 122: The back-end management device Backoffice forwards the session setup message to the media server.

Step 124: The media server allocates IP resources to the set top box.

Step 126: The media server returns a response message to the back-end management device Backoffice, and the back-end management device Backoffice forwards the response message to the set top box.

Step 128: The set top box sends a Play message, for example, an RTSP play message, to the media server.

Step 130: The media server transmits the target program to a terminal device after receiving the Play message.

In the process of switching the time-shifted program, when the set top box knows that the time-shifted program is played back to the border of the time-shifted program, the set top box needs to negotiate with the back-end management device Backoffice about session setup and teardown, and the back-end management device Backoffice participates in session setup and teardown mainly for the purpose of implementing an accounting and/or authentication function in a program on-demand mode. However, the difference between the program playback mode and the program on-demand mode lies in that accounting and/or authentication is not required again after the set top box enters the program playback mode. Therefore, in the program playback mode, the back-end management device Backoffice does not need to participate in session setup and teardown. Therefore, in the program playback mode, because the back-end management device Backoffice participates in session setup and teardown, in the process of switching the time-shifted program, a lot of signaling interactions and a long switching time are needed, and switching efficiency is low.

In view of the above problem in the prior art, the embodiments of the present invention provide a program switching method, apparatus, and media server to solve the problem in the prior art that a lot of signaling interactions and a long switching time are needed during the switching of a time-shifted program.

First the overall technical solution of a method embodiment of the present invention is described.

Method Embodiment 1

Figure 2:
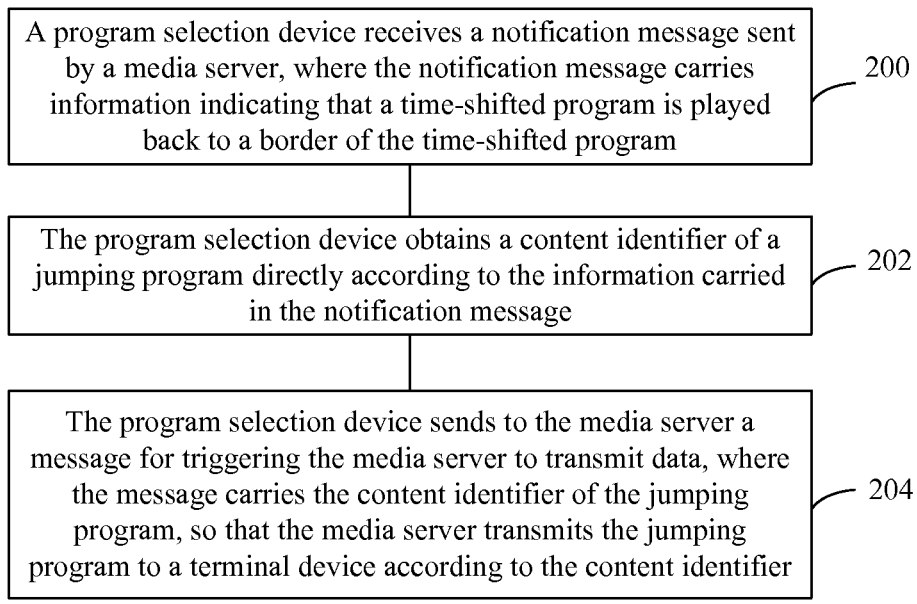
FIG. 2 is a schematic flowchart of an embodiment of a program switching method according to the present invention.

FIG. 2 is a schematic flowchart of an embodiment of a program switching method according to an embodiment of the present invention. As shown in FIG. 2, the method in the embodiment of the present invention includes:

Step 200: A program selection device receives a notification message sent by a media server, where the notification message carries information indicating that a time-shifted program is played back to a border of the time-shifted program.

In the embodiment of the present invention, the program selection device may be a terminal control device, for example, a set top box; the program selection device may also be a back-end management device Backoffice.

The carrying information indicating that a time-shifted program is played back to a border of the time-shifted program in the notification message may include: carrying information indicating that the time-shifted program is rewound to an opening credits of the time-shifted program in the notification message, or carrying information indicating that the time-shifted program is played or fast forwarded to a closing credits of the time-shifted program in the notification message.

Step 202: The program selection device obtains a content identifier of a target program directly according to the information carried in the notification message.

In the embodiment of the present invention, the program selection device skips an accounting and/or authentication process, and accesses an EPG server directly to obtain the content identifier of the target program.

For example, when the program selection device knows that the time-shifted program is played back to the border of the time-shifted program, the program selection device neither sends a session teardown message, for example, a teardown message, nor sends a session setup message, for example, an RTSP session setup message; the program selection device accesses an EPG server directly to obtain a program guide, and queries the program guide to obtain the content identifier of the target program.

Step 204: The program selection device sends to the media server a message for triggering the media server to transmit data, where the message carries the content identifier of the target program, so that the media server transmits the target program to a terminal device according to the content identifier.

In the embodiment of the present invention, a program selection device receives a notification message sent by a media server, where the notification message carries information indicating that a time-shifted program is played back to a border of the time-shifted program; the program selection device obtains a content identifier of a target program directly according to the information, and sends to the media server a message for triggering the media server to transmit data, so that the media server switches the time-shifted program; the program selection device does not negotiate with a back-end management device Backoffice about the session, and no signaling for session teardown and reestablishment is generated between the media server and the program selection device. Therefore, the embodiment of the present invention solves the problem in the prior art that a lot of signaling interactions and a long switching time are needed during the switching of a time-shifted program, thereby reducing the switching time of the time-shifted program, improving switching efficiency, and improving user experience.

Method Embodiment 2

Figure 3:
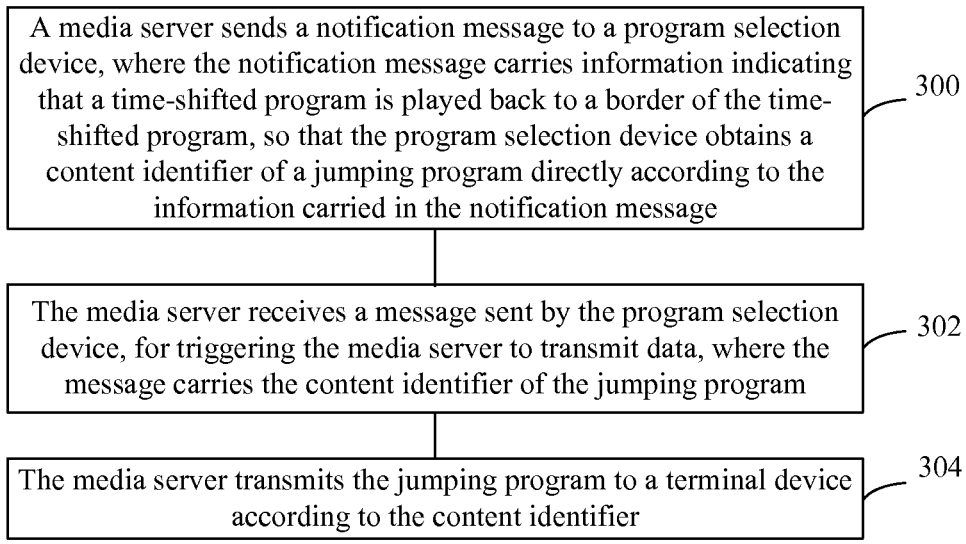
FIG. 3 is a schematic flowchart of another embodiment of a program switching method according to the present invention.

FIG. 3 is a schematic flowchart of another embodiment of a program switching method according to an embodiment of the present invention. As shown in FIG. 3, the method in the embodiment of the present invention includes:

Step 300: A media server sends a notification message to a program selection device, where the notification message carries information indicating that a time-shifted program is played back to a border of the time-shifted program, so that the program selection device obtains a content identifier of a target program directly according to the information carried in the notification message.

In the embodiment of the present invention, the program selection device may be a terminal control device, for example, a set top box; the program selection device may also be a back-end management device Backoffice.

The carrying information indicating that a time-shifted program is played back to a border of the time-shifted program in the notification message may include: carrying information indicating that the time-shifted program is rewound to an opening credits of the time-shifted program in the notification message, or carrying information indicating that the time-shifted program is played or fast forwarded to a closing credits of the time-shifted program in the notification message.

It should be noted that in the embodiment of the present invention, the program selection device skips an accounting and/or authentication process, and accesses an EPG server directly to obtain the content identifier of the target program.

For example, when the program selection device knows that the time-shifted program is played back to the border of the time-shifted program, the program selection device neither sends a session teardown message, for example, a teardown message, nor sends a session setup message, for example, an RTSP session setup message; the program selection device accesses an EPG server directly to obtain a program guide, and queries the program guide to obtain the content identifier of the target program.

It should be noted that the above example is only used for describing rather than limiting the present invention.

Step 302: The media server receives a message sent by the program selection device, for triggering the media server to transmit data, where the message carries the content identifier of the target program.

Step 304: The media server transmits the target program to a terminal device according to the content identifier.

In the embodiment of the present invention, a program selection device receives a notification message sent by a media server, where the notification message carries information indicating that a time-shifted program is played back to a border of the time-shifted program; the program selection device obtains a content identifier of a target program directly according to the information, and sends to the media server a message for triggering the media server to transmit data, so that the media server switches the time-shifted program; the program selection device does not negotiate with a back-end management device Backoffice about the session, and no signaling for session teardown and reestablishment is generated between the media server and the program selection device. Therefore, the embodiment of the present invention solves the problem in the prior art that a lot of signaling interactions and a long switching time are needed during the switching of a time-shifted program, thereby reducing the switching time of the time-shifted program, improving switching efficiency, and improving user experience.

To describe the technical solution of the present invention more clearly, in the following closing credits description, a scenario of switching a time-shifted program when a user watches a time-shifted program of the China central television 1 (CCTV-1) is used as an example.

Method Embodiment 3

Figure 4:
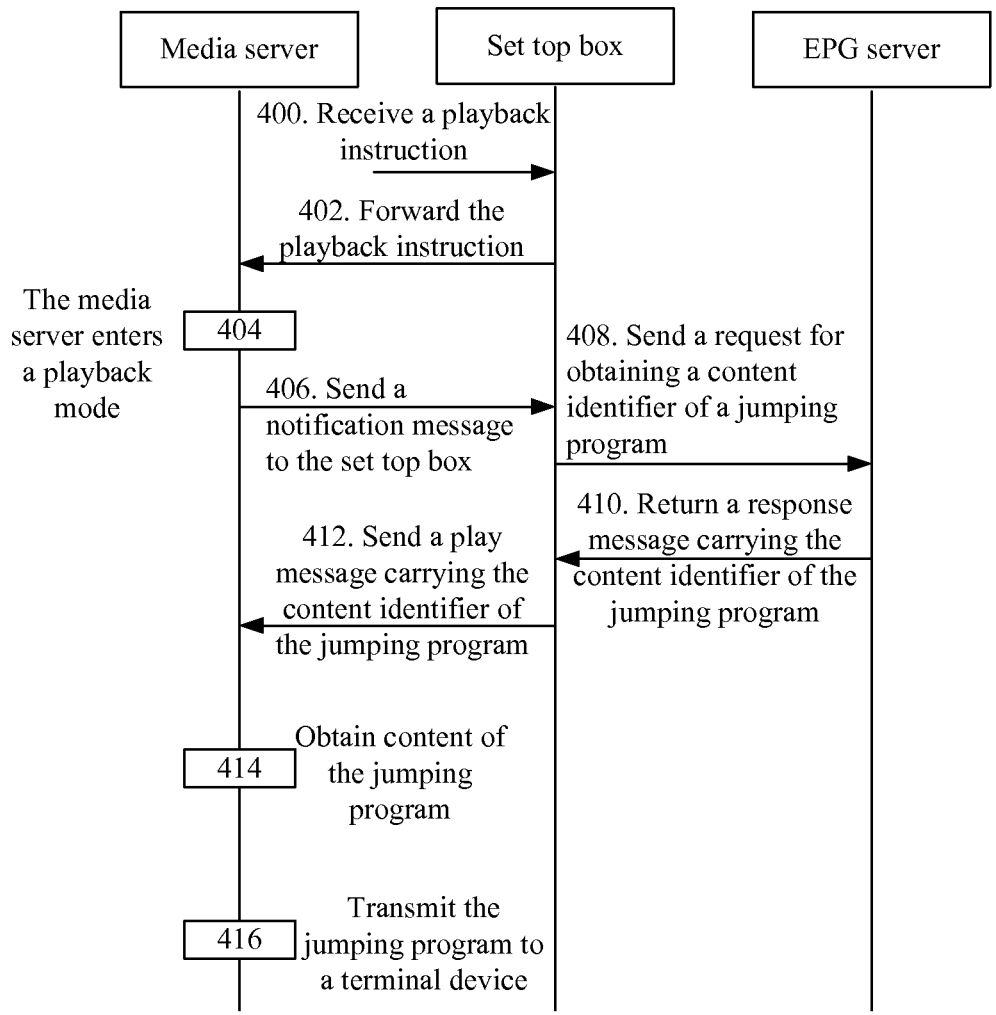
FIG. 4 is a schematic flowchart of another embodiment of a program switching method according to the present invention.

FIG. 4 is a schematic flowchart of another embodiment of a program switching method according to an embodiment of the present invention, where a set top box is used as an example of a program selection device, and news broadcast is used as an example of a time-shifted program for description.

In the embodiment of the present invention, a user operates the set top box by using a remote control; the set top box is connected to a player for audio and video playing; the set top box interacts with a media server through an RTSP protocol; the set top box interacts with an EPG server through an HTTP protocol; the EPG server runs on the set top box, and updates a program guide in real time. As shown in FIG. 4, the method in the embodiment of the present invention includes:

Step 400: The set top box receives a playback instruction for playing back news broadcast of the CCTV-1 channel.

Step 402: The set top box forwards the playback instruction to the media server.

Step 404: The media server enters a playback mode.

Step 406: When news broadcast is played back to a border of the program, the media server sends a notification message, for example, an announce message, to the set top box.

In the embodiment of the present invention, the notification message carries information indicating that news broadcast is played back to the border of the program, where the information of the border of news broadcast may be information of a border of news broadcast, or information of a closing credits of news broadcast.

For example, when news broadcast is played back or fast forwarded to the closing credits of the program, the media server may carry "Notice: 2104 "End-of-Stream Reached"" in the notification message, for notifying the set top box that news broadcast is played or fast forwarded to the closing credits of the program, where the notification message is exemplified as follows:

ANNOUNCE rtsp://videoserver234.cctv1.com:554 RTSP/1.0
CSeq: 1
Require: com.cctv1.ngod.c1
Session: 8537781583503421373
Notice: 2104 "End-of-Stream Reached"

Or, when news broadcast is rewound to the opening credits of the program, the media server may carry "Notice: 2104 "Start-of-Stream Reached"" in the notification message, for notifying the set top box that news broadcast is rewound to the opening credits of the program, where the notification message is exemplified as follows:

ANNOUNCE rtsp://videoserver234.cctv1.com:554 RTSP/1.0
CSeq: 1
Require: com.cctv1.ngod.c1
Session: 8537781583503421373
Notice: 2101 "Start-of-Stream Reached"

Step 408: The set top box sends a request for obtaining a content identifier of a target program to the EPG server.

In the embodiment of the present invention, the set top box receives a notification message carrying information indicating that news broadcast is played back to the border of the program, and parses the notification message; if the notification message carries information indicating that news broadcast is played or fast forwarded to the closing credits of the program, the set top box sends a request for obtaining a content identifier of a next program of news broadcast to the EPG server; and if the notification message carries information indicating that news broadcast is rewound to the opening credits of the program, the set top box sends a request for obtaining a content identifier of a previous program of news broadcast to the EPG server.

It should be noted that the above example is only used for describing rather than limiting the present invention.

Step 410: The EPG server returns a response message to the set top box, where the response message carries the content identifier of the target program.

Step 412: The set top box sends a Play message to the media server, where the Play message carries the content identifier of the target program.

In the embodiment of the present invention, the Play message is used for triggering the media server to transmit data according to a preset transmission mechanism, for example, the Play message may be an RTSP play message; as defined in the RTSP (Real Time Streaming Protocol, Real Time Streaming Protocol), the Play message is used for triggering the server to transmit data according to the transmission mechanism preset in a Setup message. For example, when the set top box knows that news broadcast is played back to the border of the program, the set top box does not send a session teardown message but directly accesses the EPG server to obtain the content identifier of the target program, and sends a Play message to the media server, where the Play message carries the content identifier of the target program; after receiving the Play message, the media server transmits the target program according to the transmission mechanism preset in the Step message.

In the embodiment of the present invention, the carrying, by the set top box, the content identifier of the target program in the notification message sent to the media server may be implemented in multiple manners; in the following description, carrying the identifier "abcd1234567890123456" of the target program is used as an example.

Manner 1: Adding an SDP description to the Play message, and carrying "abcd1234567890123456" through the SDP description; for example:

PLAY rtsp://videoserver234.comcast.com:554/98765 RTSP/1.0
CSeq: 456
Require: com.comcast.ngod.c1
Session: 77
Range: npt=0-
a=X-playlist-item: cctv1.com abcd1234567890123456

Manner 2: Adding an RTSP header field to the Play message, and carrying "abcd1234567890123456" through the RTSP header field; for example:

PLAY rtsp://videoserver234.comcast.com:554/98765 RTSP/1.0
CSeq: 456
Require: com.comcast.ngod.c1
Session: 77
Range: npt=0-
X-playlist-item: cctv1.com abcd1234567890123456

Manner 3: Adding a parameter to an RTSP URL of the Play message, and carrying "abcd1234567890123456" through the parameter; for example:

PLAY rtsp://videoserver234.comcast.com:554/98765?X-playlist-item=cctv1.com/abcd1234567890123456
RTSP/1.0
CSeq: 456
Require: com.comcast.ngod.c1
Session: 77
Range: npt=0-

It should be noted that the above example is only used for describing rather than limiting the present invention.

Step 414: The media server receives the Play message sent by the set top box, and obtains the content of the target program according to the content identifier of the target program which is carried in the Play message.

Step 416: The media server transmits the target program to a terminal device.

In the embodiment of the present invention, after receiving a notification message carrying information indicating that news broadcast is played to a border of the program, a set top box accesses an EPG server directly to obtain a content identifier of a target program, and sends to a media server a Play message for triggering the media server to transmit data; during switching of a time-shifted program, the set top box does not negotiate with a back-end management device Backoffice about a session, and no signaling for session teardown and reestablishment is generated between the media server and the set top box. Therefore, the embodiment of the present invention solves the problem in the prior art that a lot of signaling interactions and a long switching time are needed during the switching of a time-shifted program, thereby reducing the switching time of the time-shifted program, improving switching efficiency, and improving user experience.

Method Embodiment 4

Figure 5:
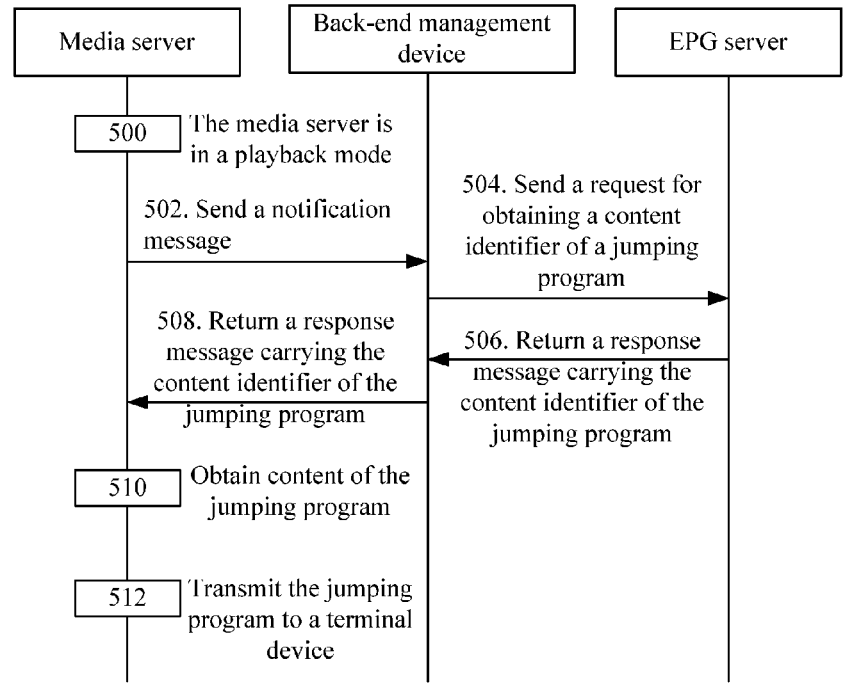
FIG. 5 is a schematic flowchart of another embodiment of a program switching method according to the present invention.

FIG. 5 is a schematic flowchart of another embodiment of a program switching method according to an embodiment of the present invention. In the embodiment of the present invention, a program selection device is specifically a back-end management device Backoffice. As shown in FIG. 5, the method in the embodiment of the present invention includes:

Step 500: A media server is in a playback mode, and is playing back news broadcast.

Step 502: When news broadcast is played back to a border of the program, the media server sends a notification message, for example, an announce message, to a back-end management device Backoffice.

In the embodiment of the present invention, the notification message carries information indicating that news broadcast is played back to the border of the program, where the information of the border of news broadcast may be information of an opening credits of news broadcast, or information of a closing credits of news broadcast.

It should be noted that the specific manner of carrying, in the notification message, the information indicating that news broadcast is played back to the border of the program is described in Method Embodiment 3, and is not further described in the embodiment of the present invention.

Step 504: The back-end management device Backoffice sends a request for obtaining a content identifier of a target program to an EPG server.

In the embodiment of the present invention, the back-end management device Backoffice receives a notification message carrying information indicating that news broadcast is played back to the border of the program, and parses the notification message; if the notification message carries information indicating that news broadcast is played or fast forwarded to the closing credits of the program, the back-end management device Backoffice sends a request for obtaining a content identifier of a next program of news broadcast to the EPG server; and if the notification message carries information indicating that news broadcast is rewound to the opening credits of the program, the back-end management device Backoffice sends a request for obtaining a content identifier of a previous program of news broadcast to the EPG server.

It should be noted that the above example is only used for describing rather than limiting the present invention.

Step 506: The EPG server returns a response message to the back-end management device Backoffice, where the response message carries the content identifier of the target program.

Step 508: The back-end management device Backoffice returns a response message to the media server, where the response message carries the content identifier of the target program.

In the embodiment of the present invention, the back-end management device Backoffice returns a response message carrying the content identifier of the target program to the media server, where the message is used for triggering the media server to transmit data according to a preset transmission mechanism.

In the embodiment of the present invention, the carrying, by the back-end management device Backoffice, the content identifier of the target program in the returned response message may be implemented in multiple manners; in the following description, carrying the identifier "abcd1234567890123456" of the target program is used as an example.

Manner 1: Adding an SDP description to the response message, and carrying "abcd1234567890123456" through the SDP description; for example:
RTSP/1.0 200 OK
CSeq: 456
Session: 77
a=X-playlist-item: cctv1.com abcd1234567890123456

Manner 2: Adding an RTSP header field to the response message, and carrying "abcd1234567890123456" through by the RTSP header field; for example:
RTSP/1.0 200 OK
CSeq: 456
Session: 77
X-playlist-item: cctv1.com abcd1234567890123456

It should be noted that the above example is only used for describing rather than limiting the present invention.

Step 510: The media server receives the response message returned by the back-end management device Backoffice, and obtains the content of the target program according to the content identifier of the target program which is carried in the response message.

Step 512: The media server transmits the target program to a terminal device.

In the embodiment of the present invention, after receiving a notification message carrying information indicating that news broadcast is played back to a border of the program, a back-end management device Backoffice accesses an EPG server directly to obtain a content identifier of a target program, and returns a response message carrying the content identifier of the target program to a media server; during switching of a time-shifted program, no signaling for session teardown and reestablishment is generated. Therefore, the embodiment of the present invention solves the problem in the prior art that a lot of signaling interactions and a long switching time are needed during the switching of a time-shifted program, thereby reducing the switching time of the time-shifted program, improving switching efficiency, and improving user experience.

The following describes apparatus embodiments of the present invention.

Apparatus Embodiment 1

Figure 6:
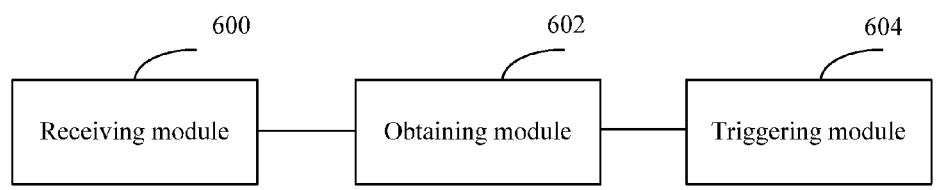
FIG. 6 is a schematic structural diagram of an embodiment of a program switching apparatus according to the present invention.

FIG. 6 is a schematic structural diagram of an embodiment of a program switching apparatus according to an embodiment of the present invention. As shown in FIG. 6, the program switching apparatus includes a receiving module 600, an obtaining module 602, and a triggering module 604.

The receiving module 600 is configured to receive a notification message sent by a media server, where the notification message carries information indicating that a time-shifted program is played back to a border of the time-shifted program.

The obtaining module 602 is connected to the receiving module 600 and configured to obtain a content identifier of a target program directly according to the information carried in the notification message.

The triggering module 604 is connected to the obtaining module 602 and configured to send to the media server a message for triggering the media server to transmit data, where the message carries the content identifier of the target program, so that the media server transmits the target program to a terminal device according to the content identifier.

It should be noted that: the apparatus is a back-end management device, and the triggering module 604 is specifically configured to return a response message to the media server, where the response message carries the content identifier of the target program, so that the media server transmits the target program to the terminal device according to the content identifier; or the apparatus is a terminal control device, and the triggering module 604 is specifically configured to send a Play message to the media server, where the Play message carries the content identifier of the target program, so that the media server transmits the target program to the terminal device according to the content identifier.

It should be further noted that the obtaining module 602 is further configured to skip an accounting and/or authentication process according to the information carried in the notification message, and access an EPG server directly to obtain the content identifier of the target program.

In addition, in the embodiment of the present invention, the carrying information indicating that a time-shifted program is played back to a border of the time-shifted program in the notification message includes: carrying information indicating that the time-shifted program is rewound to an opening credits of the time-shifted program in the notification message, or carrying information indicating that the time-shifted program is played or fast forwarded to a closing credits of the time-shifted program in the notification message.

In the embodiment of the present invention, after a program switching apparatus receives a notification message sent by a media server, where the notification message carries information indicating that a time-shifted program is played back to a border of the time-shifted program, the apparatus obtains a content identifier of a target program directly according to the information, and sends to the media server a message for triggering the media server to transmit data, so that the media server switches the time-shifted program; during switching of the time-shifted program, no signaling for session teardown and reestablishment is generated, and teardown and reestablishment of a communication connection and media transmission channel are not performed. Therefore, the problem in the prior art that a lot of signaling interactions and a long switching time are needed during the switching of the time-shifted program is solved, thereby reducing the switching time of the time-shifted program, improving switching efficiency, and improving user experience.

The following describes a media server embodiment of the present invention.

Figure 7:
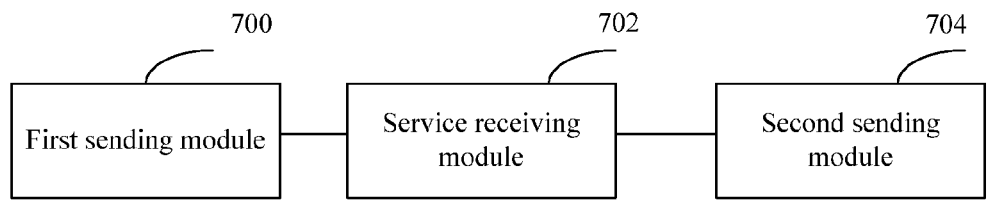
FIG. 7 is a schematic structural diagram of an embodiment of a program switching media server according to the present invention.

FIG. 7 is a schematic structural diagram of an embodiment of a program switching media server according to an embodiment of the present invention. As shown in FIG. 7, the program switching media server includes a first sending module 700, a service receiving module 702, and a second sending module 704.

The first sending module 700 is configured to send a notification message to a program selection device, where the notification message carries information indicating that a time-shifted program is played back to a border of the time-shifted program, so that the program selection device obtains a content identifier of a target program directly according to the information carried in the notification message.

The service receiving module 702 is connected to the first sending module 700 and configured to receive a message sent by the program selection device, for triggering the media server to transmit data, where the message carries the content identifier of the target program.

The second sending module 704 is connected to the service receiving module 702 and configured to transmit the target program to a terminal device according to the content identifier.

It should be noted that: in the embodiment of the present invention, the program selection device is a back-end management device, and the service receiving module 702 is specifically configured to receive a response message returned by the back-end management device, where the response message carries the content identifier of the target program; or the program selection device is a terminal control device, and the service receiving module 702 is specifically configured to receive a Play message sent by the terminal device, where the Play message carries the content identifier of the target program.

In addition, the obtaining a content identifier of a target program according to the information includes: obtaining a program guide from an EPG server according to the information, and querying the program guide to obtain the content identifier of the target program. The carrying, in the notification message, information indicating that the program being played is played to the border of the program includes: carrying information indicating that the program being played is rewound to an opening credits of the program, in the notification message, or carrying information indicating that the program being played is played or fast forwarded to a closing credits of the program, in the notification message.

In the embodiment of the present invention, a program selection device receives a notification message sent by a media server, where the notification message carries information indicating that a time-shifted program is played back to a border of the time-shifted program; the program selection device obtains a content identifier of a target program directly according to the information, and sends to the media server a message for triggering the media server to transmit data, so that the media server switches the time-shifted program; the program selection device does not negotiate with a back-end management device Backoffice about the session, and no signaling for session teardown and reestablishment is generated between the media server and the program selection device. Therefore, the embodiment of the present invention solves the problem in the prior art that a lot of signaling interactions and a long switching time are needed during the switching of a time-shifted program, thereby reducing the switching time of the time-shifted program, improving switching efficiency, and improving user experience.

It should be noted that with respect to the information interaction between the modules/units in the apparatus or media server above as well as the execution processes and the like, because they are based on the same conception as the method embodiments of the present invention and bring the same technical effects as the method embodiments, they are not repeated herein. For closing credits, reference may be made to the description in the method embodiments above.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in closing credits with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the spirit and scope of the technical solutions of the embodiments of the present invention.

What is claimed is:

1. A program switching method, wherein the method comprises:
   receiving, by a program selection device, a playback instruction for playing back;
   sending, by the program selection device, the playback instruction to a media server;
   receiving, by the program selection device, a notification message sent by the media server, wherein the notification message carries information indicating that a time-shifted program is played back to a border of the time-shifted program;
   obtaining, by the program selection device, a content identifier of a target program directly according to the information carried in the notification message; and
   sending, by the program selection device to the media server, a trigger message for triggering the media server to transmit data, wherein the trigger message carries the content identifier of the target program, so that the media server transmits the target program to a terminal device according to the content identifier;
   wherein the program selection device is a back-end management device, and wherein sending the trigger message for triggering the media server to transmit data further comprises:
   returning a response message to the media server, wherein the response message carries the content identifier of the target program.

2. The method according to claim 1, wherein the response message carries the content identifier of the target program in one of the following manners:
   manner 1, adding an SDP description to the response message, and carrying the content identifier of the target program through the SDP description; and
   manner 2, adding an RTSP header field to the response message, and carrying the content identifier of the target program through the RTSP header field.

3. The method according to claim 1, wherein the obtaining the content identifier of the target program directly comprises:
   skipping an accounting and/or authentication process, and accessing an EPG server directly to obtain the content identifier of the target program.

4. The method according to claim 1, wherein the information indicating that the time-shifted program is played back to the border of the time-shifted program comprises:
   information indicating that the time-shifted program is rewound to an opening credits of the time-shifted program, or information indicating that the time-shifted program is played or fast forwarded to a closing credits of the time-shifted program.

5. A program switching method, wherein the method comprises:
   receiving, by a program selection device, a playback instruction for playing back;
   sending, by the program selection device, the playback instruction to a media server;
   sending, by the media server, a notification message to the program selection device, wherein the notification message carries information indicating that a time-shifted program is played back to a border of the time-shifted program, so that the program selection device obtains a content identifier of a target program directly according to the information carried in the notification message;
   receiving, by the media server, a message sent by the program selection device, for triggering the media server to transmit data, wherein the message carries the content identifier of the target program; and
   transmitting, by the media server, the target program to a terminal device according to the content identifier;
   wherein the program selection device is a back-end management device, and receiving the message for triggering the media server to transmit data further comprises:
   receiving, by the media server, a response message returned by the back-end management device, wherein the response message carries the content identifier of the target program.

6. The method according to claim 5, wherein the response message carries the content identifier of the target program in one of the following manners:
   manner 1, adding an SDP description to the response message, and carrying the content identifier of the target program through the SDP description; and
   manner 2, adding an RTSP header field to the response message, and carrying the content identifier of the target program through the RTSP header field.

7. The method according to claim 5, wherein the obtaining the content identifier of the target program directly comprises:
   skipping an accounting and/or authentication process, and accessing an EPG server directly to obtain the content identifier of the target program.

8. The method according to claim 5, wherein the information indicating that the time-shifted program is played back to the border of the time-shifted program comprises:
   information indicating that the time-shifted program is rewound to an opening credits of the time-shifted program, or information indicating that the time-shifted program is played or fast forwarded to a closing credits of the time-shifted program.

9. A program switching apparatus, wherein the apparatus comprises:
 a processor; and
 a computer-readable storage medium storing a program to be executed by the processor, the program including instructions to:
  receive a playback instruction for playing back;
  send the playback instruction to a media server;
  receive a notification message sent by the media server, wherein the notification message carries information indicating that a time-shifted program is played back to a border of the time-shifted program;
  obtain a content identifier of a target program directly according to the information carried in the notification message; and
  send to the media server a message for triggering the media server to transmit data, wherein the message carries the content identifier of the target program, so that the media server transmits the target program to a terminal device according to the content identifier;
 wherein the apparatus is a back-end management device, and the program further includes instructions to return a response message to the media server, wherein the response message carries the content identifier of the target program, so that the media server transmits the target program to the terminal device according to the content identifier; or
 wherein the apparatus is a terminal control device, and the program further includes instructions to send a Play message to the media server, wherein the Nay message carries the content identifier of the target program, so that the media server transmits the target program to the terminal device according to the content identifier.

10. The apparatus according to claim 9, wherein the obtaining the content identifier of the target program directly comprises:
 skipping an accounting and/or authentication process, and accessing an EPG server directly to obtain the content identifier of the target program.

11. The apparatus according to claim 9, wherein the information indicating that the time-shifted program is played back to the border of the time-shifted program comprises:
 information indicating that the time-shifted program is rewound to an opening credits of the time-shifted program, or information indicating that the time-shifted program is played or fast forwarded to a closing credits of the time-shifted program.

12. A media server, wherein the media server comprises:
 a processor; and
 a computer-readable storage medium storing a program to be executed by the processor, the program including instructions to:
  receive a playback instruction for playing back from a program selection device;
  send a notification message to the program selection device, wherein the notification message carries information indicating that a time-shifted program is played back to a border of the time-shifted program, so that the program selection device obtains a content identifier of a target program directly according to the information carried in the notification message;
  receive a message sent by the program selection device, for triggering the media server to transmit data, wherein the message carries the content identifier of the target program; and
  transmit the target program to a terminal device according to the content identifier;
 wherein the program selection device is a back-end management device, and the program further includes instructions to receive a response message returned by the back-end management device, and wherein the response message carries the content identifier of the target program; or
 wherein the program selection device is a terminal control device, and the program further includes instructions to receive a Play message sent by the terminal device, wherein the Nay message carries the content identifier of the target program.

13. The media server according to claim 12, wherein the obtaining the content identifier of the target program directly comprises:
 skipping an accounting and/or authentication process, and accessing an EPG server directly to obtain the content identifier of the target program.

14. The media server according to claim 12, wherein the information indicating that the time-shifted program is played back to the border of the time-shifted program comprises:
 information indicating that the time-shifted program is rewound to an opening credits of the time-shifted program, or information indicating that the time-shifted program is played or fast forwarded to a closing credits of the time-shifted program.

* * * * *